United States Patent
Tanaka et al.

(10) Patent No.: US 7,664,556 B2
(45) Date of Patent: Feb. 16, 2010

(54) CONTROL OBJECT MODEL GENERATION DEVICE AND GENERATION METHOD

(75) Inventors: Masato Tanaka, Tokyo (JP); Mayumi Miura, Tokyo (JP)

(73) Assignee: Yamatake Corporation, Tokyo (JP)

( * ) Notice: Subject to any disclaimer, the term of this patent is extended or adjusted under 35 U.S.C. 154(b) by 155 days.

(21) Appl. No.: 11/666,040

(22) PCT Filed: Oct. 27, 2005

(86) PCT No.: PCT/JP2005/019762

§ 371 (c)(1),
(2), (4) Date: Apr. 19, 2007

(87) PCT Pub. No.: WO2006/046633

PCT Pub. Date: May 4, 2006

(65) Prior Publication Data

US 2007/0293957 A1 Dec. 20, 2007

(30) Foreign Application Priority Data

Oct. 28, 2004 (JP) ............................. 2004-313383

(51) Int. Cl.
  *G05B 13/04* (2006.01)
  *G05B 13/02* (2006.01)
(52) U.S. Cl. .............................. 700/30; 700/31; 700/42
(58) Field of Classification Search .................... 700/30, 700/29, 31, 42, 52; 703/2
  See application file for complete search history.

(56) References Cited

U.S. PATENT DOCUMENTS 7,346,403 B2 * 3/2008 Tanaka et al. .................. 700/52

2006/0064181 A1 * 3/2006 Kato ............................ 700/42

FOREIGN PATENT DOCUMENTS

| JP | 03-268103 | | 11/1991 |
| JP | 2758246 | | 11/1991 |
| JP | 2000-288615 | | 10/2000 |
| JP | 2004-038428 A | | 2/2004 |
| JP | 2004-260891 | * | 9/2004 |
| JP | 2004-260891 A | | 9/2004 |
| JP | 2005-070940 A | | 3/2005 |
| JP | 2005-078545 A | | 3/2005 |
| WO | WO 2004/006030 | * | 1/2004 |
| WO | WO 2005/019949 | * | 3/2005 |

* cited by examiner

*Primary Examiner*—Albert DeCady
*Assistant Examiner*—Steven R Garland
(74) *Attorney, Agent, or Firm*—Blakely, Sokoloff, Taylor & Zafman LLP

(57) ABSTRACT

A control object model generation device of this invention includes a simulation computing unit (5) which executes simulation of a control system including a controlled system represented by a mathematical model and a controller represented by a controller algorithm, a model control feature amount computing unit (8) which computes a model control feature amount from the simulation result, an evaluation function computing unit (9) which computes an evaluation function value indicating the similarity between a real control feature amount obtained from a control result on an actual controlled system and a model control feature amount, and a controlled system model parameter search computing unit (10) which executes simulation while sequentially changing the values of controlled system model parameters set in the mathematical model, and obtains controlled system model parameters which optimize the evaluation function value.

3 Claims, 7 Drawing Sheets

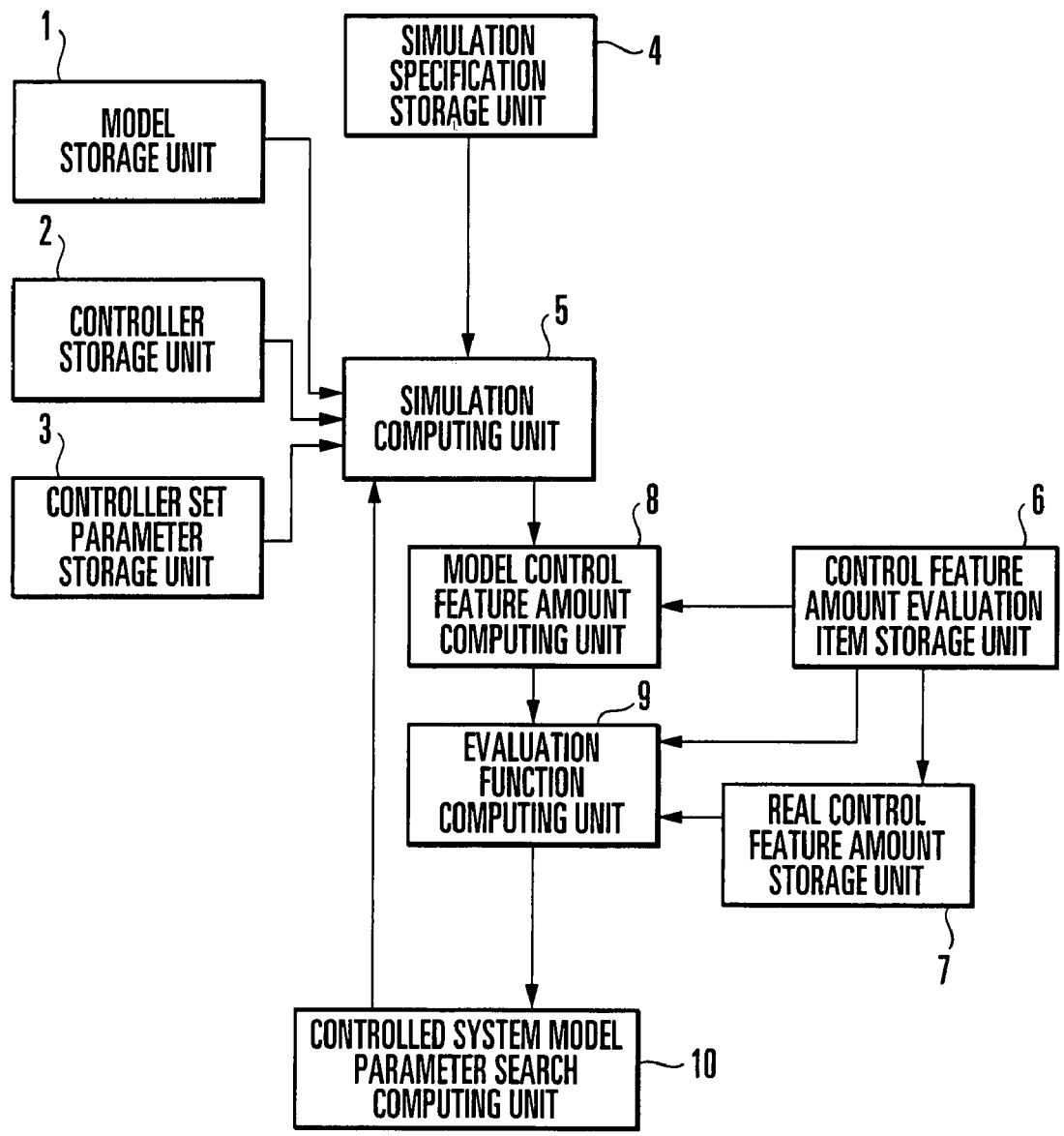
F I G. 1

CONTROL OBJECT MODEL GENERATION DEVICE AND GENERATION METHOD

This is a non-provisional application claiming the benefit of International application number PCT/JP2005/019762 filed Oct. 27, 2005.

TECHNICAL FIELD

The present invention relates to a control object model generation device and generation method which generate a controlled system model.

BACKGROUND ART

In adjusting control parameters for a controller, there is available a method of determining optimal control parameters by repeating a series of procedures including a procedure of causing an operator to adjust control parameters by using his/her experience and knowledge, a procedure of actually controlling a controlled system by using the controller for which the parameters have been set, a procedure of detecting a controlled variable output from the controlled system in accordance with a manipulated variable output from the controller, and a procedure of comparing the controlled variable with a set point of control.

This method requires much labor and adjustment cost. In place of this method, therefore, the following procedure is also practiced: analyzing process parameters (a process gain, a process time constant, and the like) including the degree of a controlled system and determining control parameters. In this procedure, a modeling step of approximating a feature of the controlled system with a mathematical model is executed, and control parameters are determined by referring to the modeling result. Conventionally, however, this method requires expert speculation and operation, and hence everyone cannot use the method.

In consideration of such a situation, reference 1 (Japanese Patent Laid-Open No. 2004-38428) discloses a control parameter adjusting technique of automatically generating a mathematical model of a controlled system by acquiring the time-series data of a manipulated variable output from a controller to the controlled system and time-series data of a controlled variable output from the controlled system in accordance with the time-series data of the manipulated variable, and allowing easy adjustment of control parameters for the controller while checking control features obtained upon changing the control parameters in accordance with simulation using the mathematical model.

DISCLOSURE OF INVENTION

Problem to be Solved by the Invention

The control parameter adjusting technique disclosed in reference 1 allows even a person who is not familiar with modeling of a controlled system to generate a mathematical model of a controlled system and easily adjust control parameters in a controller using the model. The automatic generation of a mathematical model, however, requires a data acquisition device which acquires in advance the time-series data of a manipulated variable MV output from a controlled system and the time-series data of a controlled variable PV output from the controlled system in accordance with the manipulated variable in the same data acquisition period, and stores the data in an electronic medium.

In general, a controller which is necessary to always acquire two time-series data in normal operation is rare, and it is rare that a data acquisition device is installed in advance as a constituent element of the controller. For this reason, the generation of a mathematical model requires steps of temporarily installing a data acquisition device, acquiring two time-series data, and generating a mathematical model of a controlled system. Therefore, this requires no expert knowledge about control and modeling but requires much time and labor to acquire data necessary for mathematical model generation. Furthermore, in some case, restrictions imposed on a controller in terms of hardware or the place where it is installed makes it impossible to bring in or install a data acquisition device, resulting in incapability of adjusting control parameters by mathematical model generation.

The present invention has been made to solve the above problems, and has as its object to provide a control object model generation device and generation method which require no expert knowledge about control and modeling and can greatly reduce the time and labor required to acquire time-series data.

Means of Solution to the Problem

A control object model generation device of the present invention comprises a model storage unit which stores a mathematical model of a controlled system in advance, a controller storage unit which stores in advance a controller algorithm for virtually generating a controller, a simulation computing unit which executes simulation for simulating a control response with respect to a control system including the controlled system represented by the mathematical model stored in the model storage unit and the controller represented by the controller algorithm stored in the controller storage unit, a control feature amount evaluation item storage unit which stores, as a control feature amount evaluation item in advance, a control feature amount which is used to evaluate a simulation result obtained by the simulation computing unit, a real control feature amount storage unit which stores in advance a real control feature amount corresponding to the control feature amount evaluation item which is obtained from a control result on an actual controlled system, a model control feature amount computing unit which calculates a model control feature amount corresponding to the control feature amount evaluation item on the basis of a simulation result obtained by the simulation computing unit, an evaluation function computing unit which computes an evaluation function value indicating a similarity between the real control feature amount stored in the real control feature amount storage unit and the model control feature amount calculated by the model control feature amount computing unit, and a controlled system model parameter search computing unit which causes the simulation computing unit to execute simulation while sequentially changing a value of a controlled system model parameter set in the mathematical model stored in the model storage unit, and determines, as a model parameter search result, a value of the controlled system model parameter which optimizes the evaluation function value obtained by the evaluation function computing unit.

A control object model generation method of the present invention comprises the first step of executing simulation for simulating a control response with respect to a control system including a controlled system represented by a mathematical model stored in advance and a controller represented by a controller algorithm stored in advance, the second step of storing, as a control feature amount evaluation item in advance, a control feature amount which is used to evaluate a simulation result, and calculating a model control feature amount corresponding to the control feature amount evaluation item on the basis of the simulation result, the third step of computing an evaluation function value indicating a similarity between a real control feature amount corresponding to a control feature amount evaluation item, which is obtained from a control result on an actual controlled system in advance, and a model control feature amount, and the fourth step of determining, as a model parameter search result, a value of a controlled system model parameter which optimizes an evaluation function value by repeatedly performing the first step to the third step while sequentially changing a value of a controlled system model parameter set in a mathematical model.

Effects of the Invention

The present invention virtually generates a controlled system model comprising a combination of a controller algorithm which the user uses in an actual control system and a mathematical model of a controlled system, calculates a model control feature amount for a controlled system model by executing simulation for simulating a control response with respect to the control system, and repeats simulation by using an evaluation function value representing the similarity between an actually observed real control feature amount and a model control feature amount so as to set the evaluation function value close to an optimal value, thereby searching for controlled system model parameters which the mathematical model of the controlled system has. This makes it unnecessary for the user to acquire the time-series data of a manipulated variable. In addition, with regard to a controlled variable output from the controlled system as well, simple information acquisition which allows to check real control feature amounts such as an overshoot amount and a hunting period makes it possible to automatically generate a mathematical model of the controlled system without any profound expert knowledge. In addition, the parameters for the controller can be adjusted by using the generated mathematical model.

BRIEF DESCRIPTION OF DRAWINGS

FIG. 1 is a block diagram showing the arrangement of a control object model generation device according to an embodiment of the present invention;

BEST MODE FOR CARRYING OUT THE INVENTION

The present invention generates, on a computer, a control system model comprising a combination of a controller algorithm which a user uses in an actual control system and a mathematical model of a controlled system, and calculates a model control feature amount (e.g., an overshoot amount or a hunting period) of the control system model from the control result obtained by applying set parameters for the controller actually used by the user (for example, in a PID controller, a proportional band, integral time, and derivative time) to the control system model. The present invention then searches for one parameter or a combination of a plurality of parameters as numerical values in the mathematical model of the controlled system by using an evaluation function value representing the similarity between the real control feature amount actually observed and the model control feature amount and repeating simulation of the control system model so as to set the evaluation function value close to an optimal value, thereby generating a controlled system model.

Figure 2:
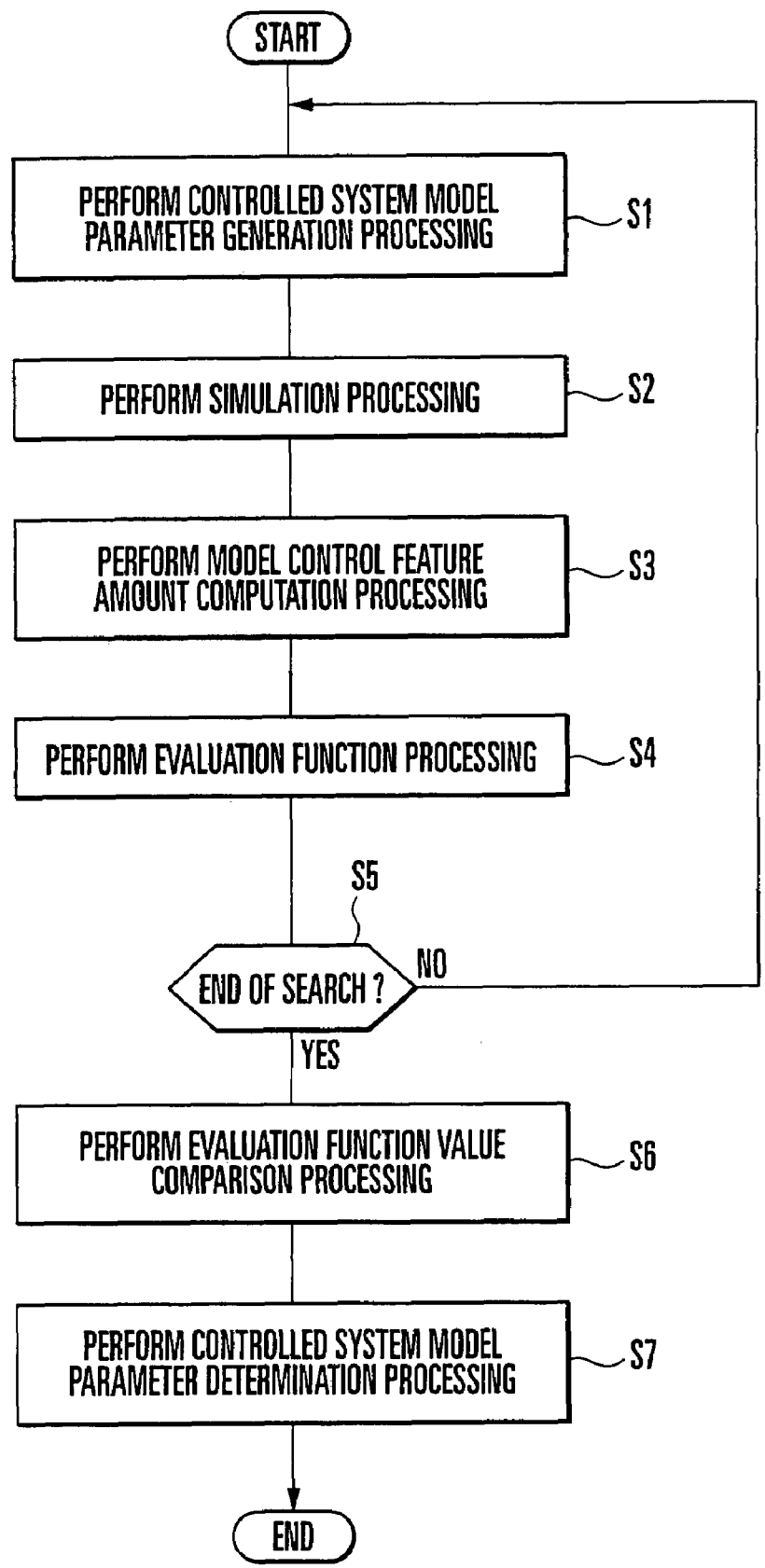
FIG. 2 is a flowchart showing the operation of the control object model generation device according to the embodiment of the present invention.

An embodiment of the present invention will be described in detail below with reference to the accompanying drawings. FIG. 1 is a block diagram showing the arrangement of a control object model generation device according to an embodiment of the present invention. FIG. 2 is a flowchart showing the operation of the control object model generation device in FIG. 1. The control object model generation device of this embodiment comprises a model storage unit 1 which stores a mathematical model of a controlled system, a controller storage unit 2 which stores in advance a controller algorithm for virtually generating a controller, a controller set parameter storage unit 3 which stores set parameters for a controller in advance, a simulation specification storage unit 4 which stores simulation specifications, a simulation computing unit 5 which executes simulation for simulating a control response with respect to a control system comprising the controlled system represented by a mathematical model and the controller represented by a controller algorithm, a control feature amount evaluation item storage unit 6 which stores in advance a control feature amount used to evaluate a simulation result as a control feature amount evaluation item, a real control feature amount storage unit 7 which stores in advance a real control feature amount corresponding to a control feature amount evaluation item which is obtained from a control result on an actual controlled system, a model control feature amount computing unit 8 which calculates a model control feature amount corresponding to a control feature amount evaluation item on the basis of a simulation result, an evaluation function computing unit 9 which computes an evaluation function value indicating the similarity between a real control feature amount and a model control feature amount, and a controlled system model parameter search computing unit 10 which causes the simulation computing unit 5 to execute simulation while sequentially changing the values of controlled system model parameters set for a mathematical model, and determines, as a model parameter search result, the values of the controlled system model parameters which optimize the evaluation function value.

The operation of the control object model generation device of this embodiment will be described below. The operation of each constituent element will be described first, and an overall processing procedure will be described next with reference to FIG. 2. The following description concerns a case wherein temperature control is performed to raise a temperature.

Assume that a controlled system has, for example, a first-order lag element and a dead time element, and a transfer function Gp for the controlled system can be expressed as follows.

$$Gp = Kp \exp(-Lps)/(1+T1s) \tag{1}$$

In equation (1), Kp is a process gain, Lp is a process dead time, T1 is a process time constant, and s is a Laplace operator. The user who uses the control object model generation device registers transfer function expression (1) as a mathematical model of the controlled system in the model storage unit 1 in advance. In this case, the user registers the process gain Kp, process dead time Lp, and process time constant T1 as variables.

The user registers a controller algorithm, i.e., a program for causing the simulation computing unit 5 to virtually generate a controller equivalent to an actual device which is used to control the controlled system, in the controller storage unit 2 in advance. When using, for example, a PID controller, the user registers a transfer function expression representing the following PID controller algorithm in advance.

$$MV = (100/Pb)\{1+(1/Tis)+Tds\}(SP-PV) \tag{2}$$

In equation (2), Pb, Ti, and Td are PID parameters, which are respectively a proportional band, integral time, and derivative time, and MV, SP, and PV are respectively a manipulated variable, set point, and controlled variable. The proportional band Pb, integral time Ti, derivative time Td, and set point SP are registered in the controller set parameter storage unit 3 in advance. The manipulated variable MV and controlled variable PV are variables which dynamically change at the time of simulation executed by the simulation computing unit 5.

The user registers, in the controller set parameter storage unit 3 in advance, parameters for a controller required to calculate the manipulated variable MV in accordance with the controller algorithm registered in the controller storage unit 2. When the user is to use, for example, the PID controller algorithm expressed by equation (2), the registered parameters include the proportional band Pb, integral time Ti, and derivative time Td as PID parameters, and the set point SP and a control period cdt of the controller as other parameters. Note that after the control object model generation device according to this embodiment generates a controlled system model, the final values of PID parameters are obtained by a known technique using this controlled system model. Therefore, the proper values of the PID parameters are unsettled, and the values of the PID parameters registered in the controller set parameter storage unit 3 are the values which the user arbitrarily sets in the actual control system.

The user registers simulation specifications such as an initial value PVini of the controlled variable PV, an initial value MVini of the manipulated variable MV, and a total simulation time tsim in the simulation specification storage unit 4 in advance. The total simulation time tsim is used to determine the end of simulation. When the elapsed time from a simulation start time reaches tsim, the simulation ends.

Figure 3:
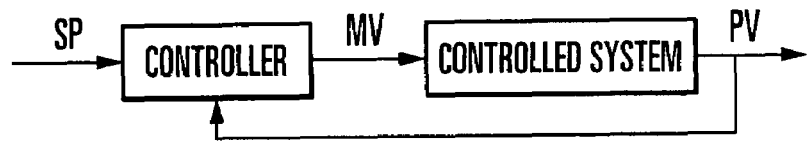
FIG. 3 is a block diagram of a virtual control system according to the embodiment of the present invention.

The simulation computing unit 5 performs simulation for simulating a control response with respect to a virtual control system comprising the controlled system represented by a mathematical model in the model storage unit 1 and the controller represented by a controller algorithm in the controller storage unit 2 on the basis of the controller set parameters registered in the controller set parameter storage unit 3, the simulation specifications registered in the simulation specification storage unit 4, and the controlled system model parameters generated by the controlled system model parameter search computing unit 10. FIG. 3 is a block diagram of the virtual control system in this case. The simulation computing unit 5 obtains a combination of a time in a total simulation time and the time-series data of the controlled variable PV by repeatedly computing the manipulated variable MV using the controller algorithm and computing the controlled variable PV using the manipulated variable MV and the mathematical model of the controlled system.

Figure 4:
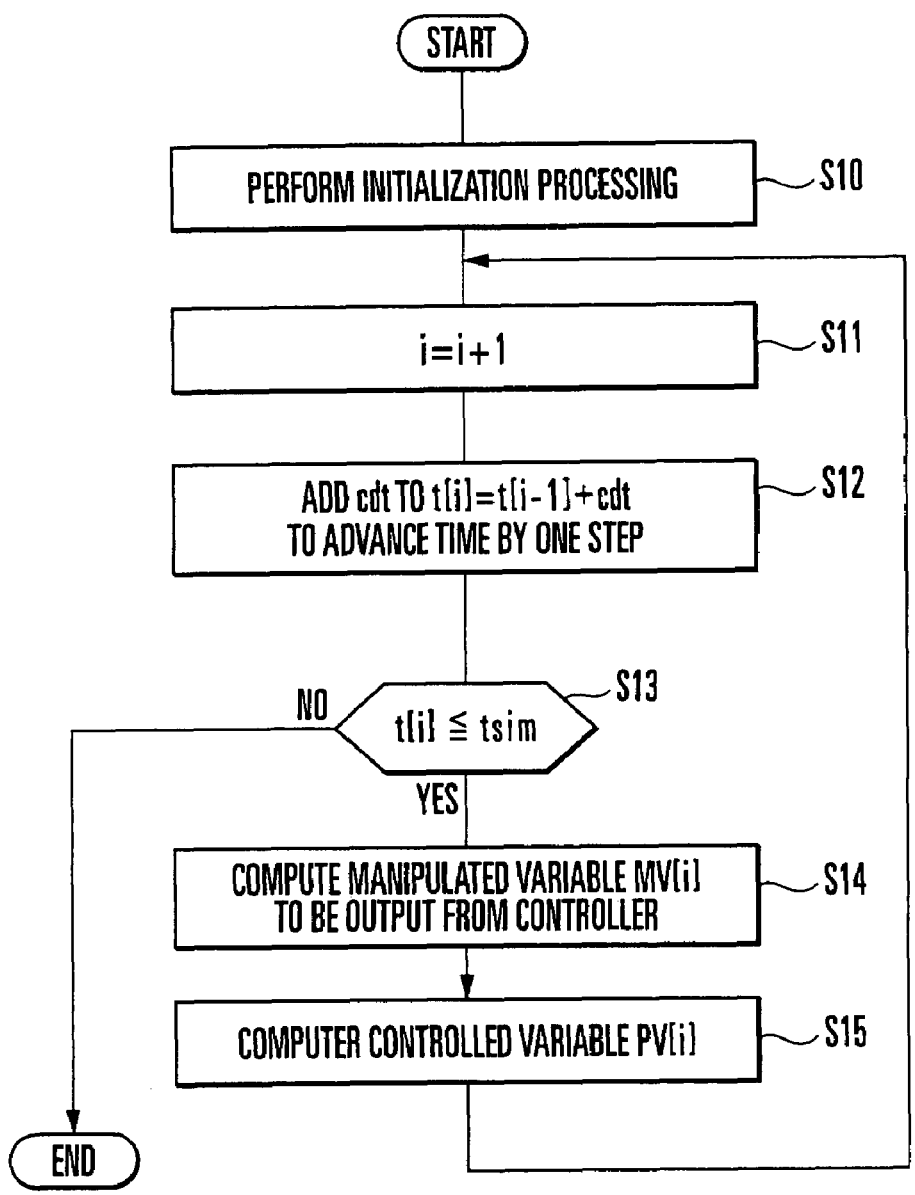
FIG. 4 is a flowchart showing the operation of a simulation computing unit according to the embodiment of the present invention.

FIG. 4 is a flowchart showing the operation of the simulation computing unit 5. The simulation computing unit 5 executes initialization processing (step S10 in FIG. 4), simulation processing (steps S11, S12, S14, and S15), and simulation end determination processing (step S13).

In the initialization processing, the simulation computing unit 5 initializes a count value i for identifying simulation time t[i] to 0, and sets simulation start time t[0] to 0. The simulation computing unit 5 sets an initial value PV[0] of a controlled variable at the simulation start time to PVini, and sets an initial value MV[0] of a manipulated variable to MVini.

In simulation processing, the simulation computing unit 5 counts up the count value i by one to set i=1 (step S11), and then calculates simulation time t[i] according to t[i]=t[i−1]+cdt (step S12).

Subsequently, the simulation computing unit 5 performs simulation end determination processing on the basis of the total simulation time tsim registered in the simulation specification storage unit 4, and determines whether t[i]=tsim holds (step S13). If t[i]=tsim, i.e., time t[i] does not exceed the total simulation time tsim, the simulation computing unit 5 advances to step S14 to continue the simulation processing.

When continuing the simulation processing, the simulation computing unit 5 calculates a manipulated variable MV[i] at time t[i] by using the parameters registered in the controller set parameter storage unit 3 and the following equation based on equation (2) registered in the controller storage unit 2 (step S14).

$$MV[i] = (100/Pb)\{1+(1/Tis)+Tds\}(SP-PV[i-1]) \tag{3}$$

The simulation computing unit 5 then calculates a controlled variable PV[i] at time t[i] by using the controlled system model parameters generated by the controlled system model parameter search computing unit 10 and the following equation based on equation (1) registered in the model storage unit 1 (step S15).

$$PV[i] = \{Kp \exp(-Lps)/(1+T1s)\}MV[i] \tag{4}$$

The simulation computing unit 5 stores the calculated controlled variable PV[i] in correspondence with time t[i].

The simulation computing unit 5 then returns to step S11 to count up the count value i by one to set i=2, and calculates (t[i], PV[i]) in the same manner as in the case of i=1. The simulation computing unit 5 repeats the processing in steps S11 to S15 in this manner. In the repetitive processing, if determining in step S13 that t[i]>tsim, i.e., time t[i] exceeds the total simulation time tsim, the simulation computing unit 5 terminates the simulation processing. At this end time, a combination (t[i], PV[i]) of time t[i] defined by time t[i]=0 to t[i]=tsim and the time-series data of the controlled variable PV[i] have been obtained.

The user registers, in the control feature amount evaluation item storage unit 6 in advance, the type of control feature amount which is an evaluation target as an evaluation item (to be called a control feature amount evaluation item hereinafter) at the time of evaluation of a simulation result. If the type of control feature amount registered as a control feature amount evaluation item is, for example, charName[k], registration is performed such that charName[1]="set point arrival time", charName[2]="overshoot amount", and charName[3]="hunting period".

There is also available a method of registering several types of control feature amounts in the control feature amount evaluation item storage unit 6 in advance, making the user select one or more of them which is to be used as a control feature amount evaluation item, and setting a flag indicating an evaluation target in the control feature amount evaluation item selected by the user, thereby registering the control feature amount evaluation item in the control feature amount evaluation item storage unit 6.

The user registers, in the real control feature amount storage unit 7 in advance, a real control feature amount realVal[k] which is obtained from a control result on the actual controlled system and corresponds to the control feature amount evaluation item registered in the control feature amount evaluation item storage unit 6. The real control feature amount realVal[k] is obtained from the result obtained by controlling the actual controlled system using the actual PID controller in which the same values as those of the PID parameters in the controller set parameter storage unit 3 are set. It suffices to use a feature amount obtaining method of observing the controlled variable PV using a timepiece for measuring the time and a display device generally incorporated in a controller, and measuring a control feature amount such as a set point arrival time, overshoot amount, or hunting period.

In addition, a real control feature amount detection flag realFlag[k] indicating whether the real control feature amount realVal[k] can be detected is registered in the real control feature amount storage unit 7 in advance. If a real control feature amount corresponding to the control feature amount charName[k] can be detected, the real control feature amount detection flag realFlag[k] is set to 1. If a real control feature amount corresponding to a control feature amount charName[k] cannot be detected, the real control feature amount detection flag realFlag[k] is set to 0.

If, for example, a set point arrival time corresponding to a control feature amount charName[1] is 120 [sec] in actual control, realFlag[1]=1 and realVal[1]=120 [sec] are registered. In addition, if an overshoot amount corresponding to the control feature amount charName[2] is 10 [° C.] in actual control, realFlag[2]=1 and realVal[2]=10 [° C.] are registered. Furthermore, if a hunting period corresponding to the control feature amount charName[3] is 20 [sec] in actual control, realFlag[3]=1 and realVal[3]=20 [sec] are registered.

The model control feature amount computing unit 8 calculates a model control feature amount mdlVal[k] corresponding to the control feature amount evaluation item registered in the control feature amount evaluation item storage unit 6 on the basis of the time-series data (t[i], PV[i]) obtained by the simulation computing unit 5, and stores the calculated data. The model control feature amount computing unit 8 stores a model control feature amount detection flag mdlFlag[k] indicating whether the model control feature amount mdlVal[k] based on the time-series data (t[i], PV[i]) can be calculated. If the model control feature amount mdlVal[k] corresponding to the control feature amount charName[k] can be calculated, the model control feature amount detection flag mdlFlag[k] is set to 1. Otherwise, the model control feature amount detection flag mdlFlag[k] is set to 0.

Figure 5:
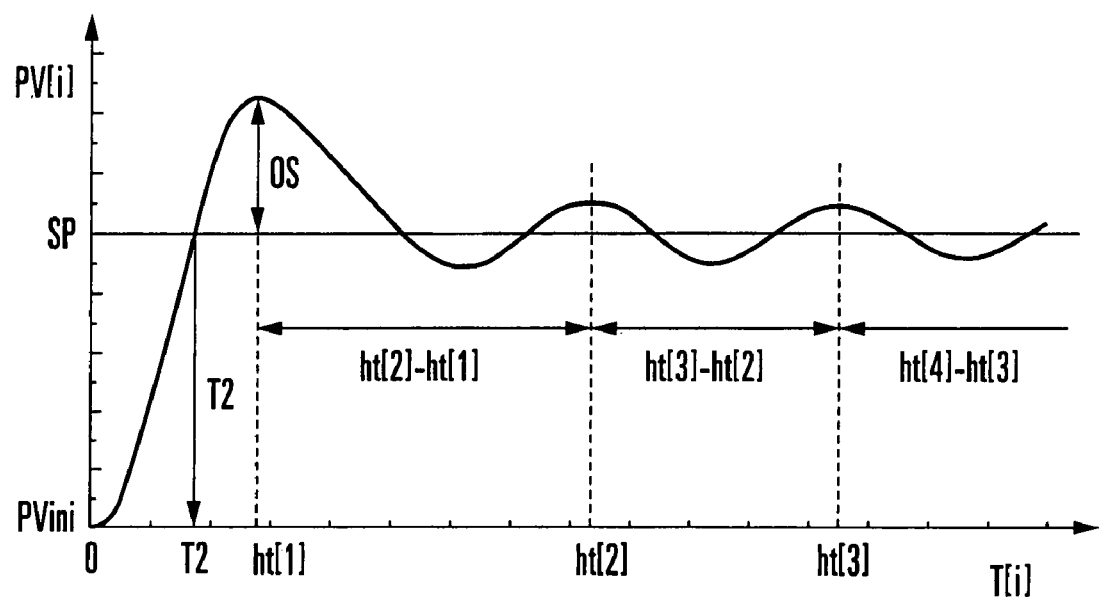
FIG. 5 is a view showing the relationship between time-series data obtained by the simulation computing unit and a model control feature amount.

FIG. 5 shows the relationship between the time-series data (t[i], PV[i]) and model control feature amounts (set point arrival time, overshoot amount, and hunting period). A set point arrival time T2 is the time taken for the controlled variable PV[i] to reach from the initial value PVini to the set point SP. An overshoot amount OS is the maximum deviation of the controlled variable PV[i] with respect to the set point SP. A hunting period is regarded as the time average value between maximum values of the controlled variable PV[i]. Although the controlled variable PV[i] is a discrete value calculated for each control period cdt, FIG. 5 shows this value as a continuous value in the form of a curve.

The operation of calculating a set point arrival time and an overshoot amount of model control feature amounts will be described next with reference to FIG. 6. First of all, the model control feature amount computing unit 8 performs initialization processing (step S20 in FIG. 6). In the initialization processing, the model control feature amount computing unit 8 initializes the count value i for identifying the time-series data t[i] to 0, initializes model control feature amount detection flags mdlFlag[1] and mdlFlag[2] to 0, and initializes model control feature amounts mdlVal[1] and mdlVal[2] to 0.

Following the initialization processing, the model control feature amount computing unit 8 counts up the count value i by one (step S21), and determines whether the time-series data t[i] corresponding to the count value i is equal to or less than the total simulation time tsim (step S22). If the time-series data t[i] is equal to or less than total simulation time tsim, the model control feature amount computing unit 8 determines whether PV[i]>SP holds (step S23). If the time-series data PV[i] is equal to or less than the set point SP, the model control feature amount computing unit 8 returns to step S21.

Upon determining that the controlled variable PV[i] exceeds the set point SP (YES in step S23) after repeating the processing in steps S21 to S23, the model control feature amount computing unit 8 sets the model control feature amount mdlVal[1] representing the set point arrival time to the time-series data t[i], and sets the model control feature amount detection flag mdlFlag[1] to 1 (step S24).

If it is determined in step S22 that the time-series data t[i] exceeds the total simulation time tsim, it indicates that the time-series data PV[i] does not exceed the set point SP within the range of 0=t[i]=tsim, and no set point Arrival time could be detected. In addition, if no set point arrival time can be detected, it indicates that no overshoot amount can be detected. In this case, therefore, the model control feature amount computing unit 8 terminates the processing in FIG. 6. In this case, the model control feature amount detection flags mdlFlag[1] and mdlFlag[2] and the model control feature amounts mdlVal[1] and mdlVal[2] all remain 0.

Only when it is determined in step S23 that PV[i]>SP holds, and a set point arrival time can be detected, the process advances to step S25 to detect an overshoot amount. If a set point arrival time can be detected, the model control feature amount computing unit 8 computes dPV[i]=PV[i]−PV[i−1] as initialization processing of a change amount dPV[i] of the time-series data PV[i] (step S25). The change amount dPV[i] is the change amount between the time-series data PV[i] and PV[i−1]. The sign of dPV[i] allows to determine whether PV[i] has increased (dPV[i] is a positive value) or has decreased (dPV[i] is a negative value). An overshoot amount can be obtained by detecting the timing of change from an increase in the time-series data PV[i] to a decrease therein after the set point arrival time by using the change amount dPV[i].

After initializing the change amount dPV[i], the model control feature amount computing unit 8 counts up the count value i by one (step S26), and determines whether the time-series data t[i] corresponding to the count value i is equal to or less than the total simulation time tsim (step S27). If the time-series data t[i] is equal to or less than the total simulation time tsim, the model control feature amount computing unit 8 calculates the change amount dPV[i] according to the following equation (step S28).

$$dPV[i]=PV[i]-PV[i-1] \qquad (5)$$

The model control feature amount computing unit 8 checks whether a change amount dPV[i] calculated by a count value i−1 is a positive value and the change amount dPV[i] calculated by the current count value i is a negative value (step S29). If this condition is not satisfied (NO in step S29), the process returns to step S26 to count up the count value i by one and calculate the change amount dPV[i]. The model control feature amount computing unit 8 repeats the processing in steps S26 to S29 in this manner. If YES in step S29, the model control feature amount computing unit 8 regards the time-series data PV[i−1] corresponding to the count value i−1 as a maximum value, and sets the model control feature amount mdlVal[2] representing an overshoot amount to PV[i−1]−SP, and the model control feature amount mdlVal[2] to 1 (step S30). Note that if the change amount dPV[i] calculated in step S28 becomes 0 during repetitive processing in steps S26 to S29, the model control feature amount computing unit 8 sets dPV[i−1] representing the immediately preceding change amount of the count value i−1 to dPV[i] (execute dPV[i]=dPV[i−1]), and continues the processing in the next step (S29) and the subsequent steps. With the above operation, the processing in FIG. 6 is terminated.

Figure 6:
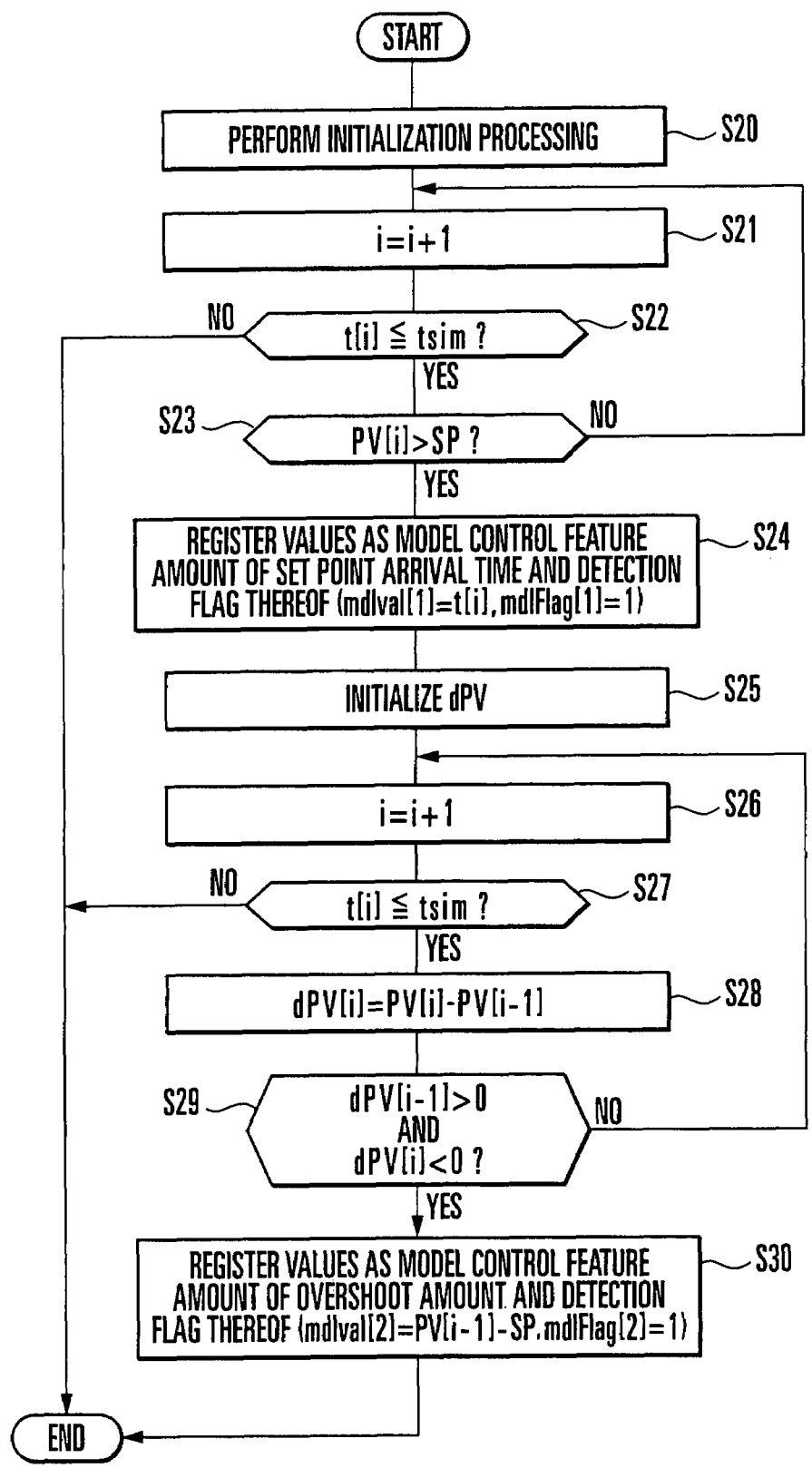
FIG. 6 is a flowchart showing the operation in which a model control feature amount computing unit according to the embodiment of the present invention calculates a set point arrival time and an overshoot amount.

Upon determining in step S27 that the time-series data t[i] exceeds the total simulation time tsim, the model control feature amount computing unit 8 terminates the processing in FIG. 6 without detecting an overshoot amount. In this case, the model control feature amount mdlVal[2] and the model control feature amount detection flag mdlFlag[2] remain 0. Note that the above method of calculating a set point arrival time and an overshoot amount is only an example.

The operation of calculating a hunting period of model control feature amounts will be described next with reference to FIG. 7. First of all, the model control feature amount computing unit 8 performs initialization processing (step S40 in FIG. 7). In the initialization processing, the model control feature amount computing unit 8 sets the number (n) of the maximum values of the time-series data PV[i] to 0, and also sets a model control feature amount detection flag mdlFlag[3] and a model control feature amount mdlVal[3] to 0. In addition, the model control feature amount computing unit 8 sets the count value i for identifying the time-series data t[i] to 1, and sets the change amount dPV[i] of the time-series data PV[i] to PV[i]−PV[i−1], thereby terminating the initialization processing. This embodiment will also exemplify a method of detecting time t[i] when the maximum value of the time-series data PV[i] has appeared by using the change amount dPV[i] as in the above case of computation of the overshoot amount, storing the detected time as detected time ht[n], and setting the average value of ht[n]−ht[n−1] as a hunting period.

Following the initialization processing, the model control feature amount computing unit 8 counts up the count value i by one (step S41), and determines whether the time-series data t[i] corresponding to the count value i is equal to or less than the total simulation time tsim (step S42). If the time-series data t[i] is equal to or less than total simulation time tsim, the model control feature amount computing unit 8 calculates the change amount dPV[i] according to equation (5) (step S43).

The model control feature amount computing unit 8 checks whether the change amount dPV[i−1] calculated by the immediately preceding count value i−1 is a positive value and the change amount dPV[i] calculated by the current count value i is a negative value (step S44). If this condition does not hold (NO in step S44), the process returns to step S41 to count up the count value i and calculate the change amount dPV[i]. In this manner, the model control feature amount computing unit 8 repeats the processing in steps S41 to S44. If YES in step S44, the model control feature amount computing unit 8 regards the time-series data PV[i−1] corresponding to the count value i−1 as a maximum value, and increases the number n of maximum values by one (step S45). The model control feature amount computing unit 8 stores the data t[i−1] at the time when the maximum value is produced as detected time ht[n] (step S46). The process then returns to step S41. Note that if the change amount dPV[i] calculated in step S43 becomes 0 during the repetitive processing in steps S41 to S44, the model control feature amount computing unit 8 sets dPV[i−1] representing the immediately preceding count value i−1 to dPV[i] (executes dPV[i]=dPV[i−1]), and continues the processing in the next step (S44) and the subsequent steps.

If the time-series data t[i] exceeds the total simulation time tsim during the repetitive processing in steps S41 to S46 (YES in step S42), the model control feature amount computing unit 8 advances to step S47 to determine whether the number n of maximum values is two or more. If the number n of maximum values is two or more, the model control feature amount computing unit 8 calculates an average value C of the periods of the maximum values of time-series data PV[i] according to equation (6) given below, sets the model control feature amount mdlVal[3] representing a hunting period to the average C, and sets the model control feature amount detection flag mdlFlag[3] to 1 (step S48). With the above operation, the processing in FIG. 7 is terminated. Upon determining in step S47 that the number n of maximum values is one or less, the model control feature amount computing unit 8 terminates the processing in FIG. 7 without detecting any hunting period. In this case, the model control feature amount detection flag mdlFlag[3] and the model control feature amount mdlVal[3] remain the initial value 0.

$$C = \sum_{k=2}^{n} (ht[k] - ht[k-1])/(n-1) \qquad (6)$$

Obviously, in the initialization processing in step S40, the user can limit the computation of a hunting period within the range of conditions for the observation of a hunting period and times of observation (this may be an assumed range) by using a method of setting a set point arrival time or an overshoot amount detection time to a computation start time or setting the maximum value of the number n of maximum values to be detected as a termination condition for computation. The computation method described above is only an example of the method of calculating a hunting period.

Figure 7:
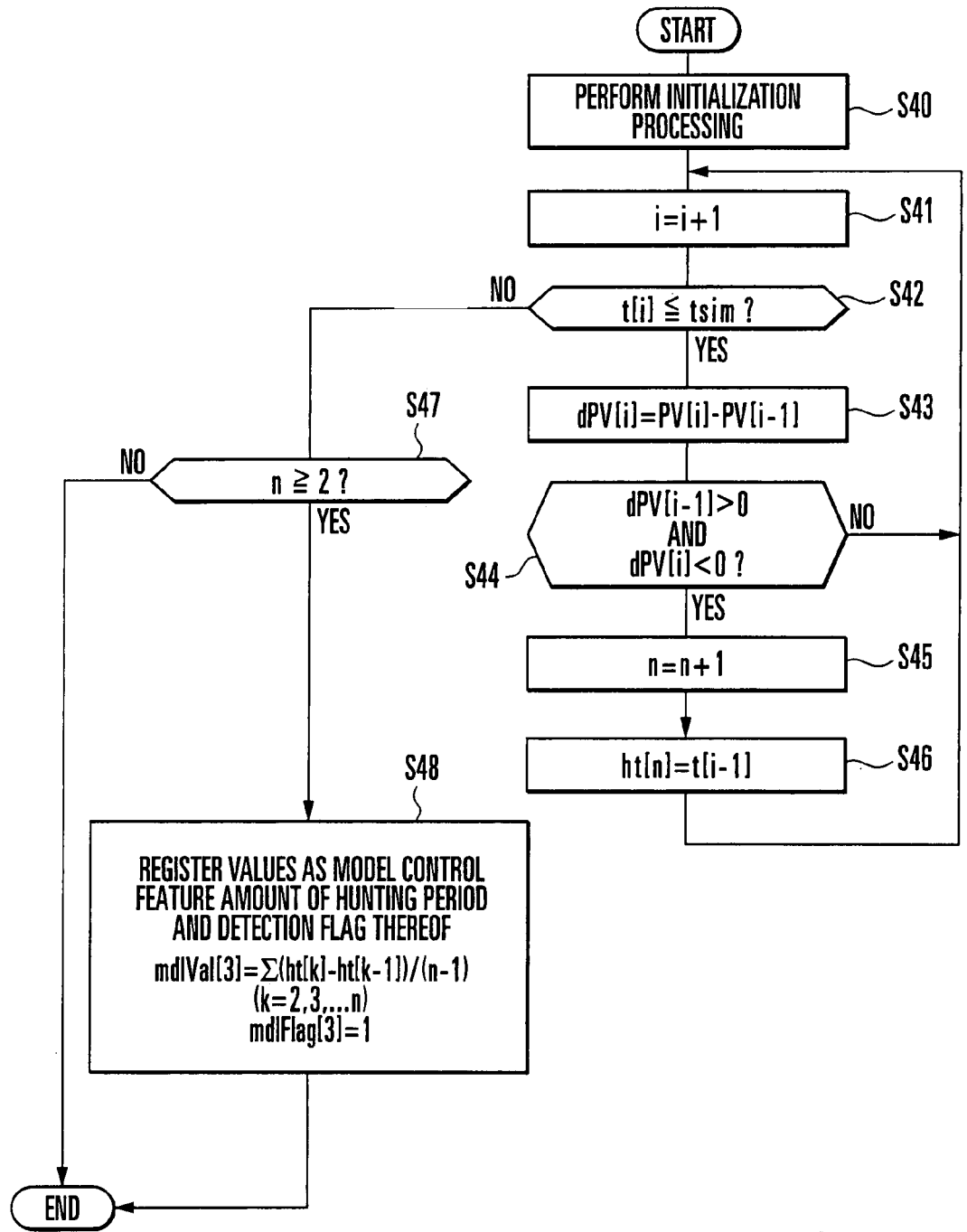
FIG. 7 is a flowchart showing the operation in which a model control feature amount computing unit according to the embodiment of the present invention calculates a hunting period.

With the processing in FIGS. 6 and 7, the model control feature amount computing unit 8 stores, for example, mdlFlag[1]=1 and mdlVal[1]=118 [sec] concerning a set point arrival time, stores mdlFlag[2]=1 and mdlVal[2]2=12 [° C.] concerning an overshoot amount, and stores mdlFlag[3]=1 and mdlVal[3]=16 [sec] concerning a hunting period.

The evaluation function computing unit 9 compares the real control feature amount stored in the real control feature amount storage unit 7 with the model control feature amount calculated by the model control feature amount computing unit 8, and executes the evaluation function processing of obtaining an evaluation function value F indicating the similarity between them. The evaluation function computing unit 9 executes evaluation function processing like that shown in FIG. 8, which obtains the evaluation function value F, from realFlag[k] representing whether the above real control feature amount is observed and realVal[k] representing the value of the real control feature amount and mdlFlag[k] representing whether the above model control feature amount is detected and mdlVal[k] representing the value of the model control feature amount. In this case, when the evaluation function value F (0 or more) is 0 or a minimum value near 0, an optimal value is obtained. In this case, the real control feature amount is closest to the model control feature amount.

Figure 8:
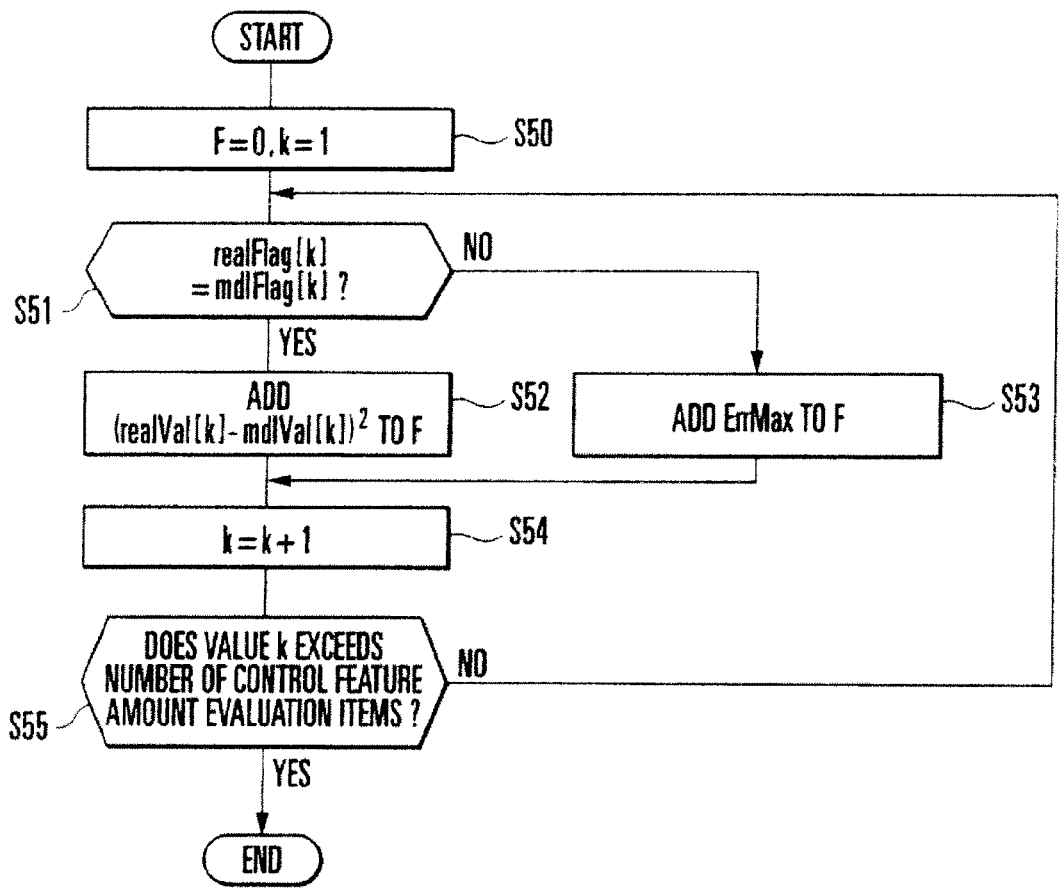
FIG. 8 is a flowchart showing the operation of an evaluation function computing unit according to the embodiment of the present invention.

First of all, the evaluation function computing unit 9 performs initialization processing of initializing the evaluation function value F to 0 and initializing a count value k for identifying a control feature amount evaluation item to 1 (step S50 in FIG. 8). The evaluation function computing unit 9 then determines whether the real control feature amount detection flag realFlag[k] is equal to the model control feature amount detection flag mdlFlag[k] (step S51). If they are equal to each other, the evaluation function computing unit 9 adds (realVal[k]−mdlVal[k])$^2$ to the evaluation function value F (step S52). If the real control feature amount detection flag realFlag[k] is not equal to the model control feature amount detection flag mdlFlag[k], the evaluation function computing unit 9 adds a predetermined value ErrMax to the evaluation function value F (step S53). In this case, ErrMax is a positive value sufficiently larger than 0.

The evaluation function computing unit 9 then counts up the count value k by one (step S54), and determines whether the count value k exceeds the number of control feature amount evaluation items registered in the control feature amount evaluation item storage unit 6 (step S55). If the count value k is equal to or less than the number of the control feature amount evaluation items, the process returns to step S51. In this manner, the evaluation function computing unit 9 repeats the processing in steps S51 to S55. When the count value k exceeds the number of control feature amount evaluation items, the processing in FIG. 8 is terminated. The evaluation function computing unit 9 stores the calculated evaluation function value F.

The controlled system model parameter search computing unit 10 then executes controlled system model parameter search processing which comprises controlled system model parameter generation processing, evaluation function value comparison processing, and controlled system model parameter determination processing.

In the controlled system model parameter generation processing, the controlled system model parameter search computing unit 10 sequentially generates all values which parameters for the controlled system model can take, i.e., all combinations which process gains Kp, process dead times Lp, and process time constants T1 can take, one by one. Let dKp, dLp, and dT1 be respectively change widths for the generation of the respective parameters. Letting Kp_max be a predetermined process gain maximum value, Lp_max be a process dead time maximum value, and T1_max be a process time constant maximum value, the process gain Kp is generated within the range defined by 0<Kp=Kp_max with a resolution dKp as an accuracy, the process time Lp is generated within the range defined by 0<Lp=Lp_max with a resolution dLp as an accuracy, and the process time constant T1 is generated within the range defined by 0<T1=T1_max with a resolution dT1 as an accuracy.

In the evaluation function value comparison processing, the controlled system model parameter search computing unit 10 compares the evaluation function values F calculated with respect to all the combinations which the process gains Kp, the process times Lp, and the process time constants T1 can take, and extracts a combination of the process gain Kp, the process time Lp, and the process time constant T1 which provides a minimum evaluation function value F_min (F_min=0) of all the evaluation function values F.

In the controlled system model parameter determination processing, the controlled system model parameter search computing unit 10 uses the combination of the process gain Kp, the process time Lp, and process time constant T1 which is extracted in the evaluation function value comparison processing as a model parameter search result.

Note that the above controlled system model parameter search processing is a technique of searching for the optimal values of controlled system model parameters by generating all values which parameters for the controlled system model can take one by one and causing the simulation computing unit 5 to execute simulation processing. However, this technique takes no consideration to search efficiency, and is merely an example. It suffices to use, for example, the Powell's method, which is generally known, as an efficient technique of making the simulation computing unit 5 perform operation like search operation while sequentially changing the values of controlled system model parameters so as to set the evaluation function value F close to an optimal value.

A processing procedure in the control object model generation device in FIG. 1 will be described next with reference to FIG. 2. First of all, the controlled system model parameter search computing unit 10 performs controlled system model parameter generation processing of generating controlled system model parameters comprising a combination of the process gain Kp, the process time Lp, and the process time constant T1 (step S1 in FIG. 2).

Subsequently, the simulation computing unit 5 performs simulation processing described with reference to FIG. 4 by using the generated controlled system model parameters (step S2). The model control feature amount computing unit 8 performs the model control feature amount computation processing described with reference to FIGS. 6 and 7 (step S3). The evaluation function computing unit 9 performs the evaluation function processing described with reference FIG. 8 (step S4).

After the simulation processing, model control feature amount computation processing, and evaluation function processing, the controlled system model parameter search computing unit 10 determines whether the processing in steps S1 to S4 is complete for all the combinations of values which controlled system model parameters can take (step S5). If the processing in steps S1 to S4 is complete with respect to all the combinations of values which controlled system model parameters can take, the process advances to step S6. Otherwise, the process returns to step S1, in which the controlled system model parameter search computing unit 10 generates controlled system model parameters comprising a new combination of the values of the process gain Kp, process time Lp, and process time constant T1. In this manner, the processing in steps S1 to S4 is executed with respect to each of combinations of values which controlled system model parameters can take, and the evaluation function value F corresponding to each combination is obtained.

When the processing in steps S1 to S4 is complete with respect to all the combinations of values which controlled system model parameters can take, the controlled system model parameter search computing unit 10 executes evaluation function value comparison processing and extracts a combination of the process gain Kp, the process time Lp, and the process time constant T1 which provides a minimum evaluation function value F_min (step S6). The controlled system model parameter search computing unit 10 then determines the extracted combination of the process gain Kp, the process time Lp, and the process time constant T1 as a model parameter search result (step S7). With the above operation, the control object model generation device terminates the processing.

This embodiment virtually generates a controlled system model comprising a combination of a controller algorithm which the user uses in an actual control system and a mathematical model of a controlled system, calculates a model control feature amount for a controlled system model by executing simulation for simulating a control response with respect to the control system, and repeats simulation by using an evaluation function value representing the similarity between an actually observed real control feature amount and a model control feature amount so as to set the evaluation function value close to an optimal value, thereby searching for controlled system model parameters which the mathematical model of the controlled system has. This makes it unnecessary for the user to acquire the time-series data of the manipulated variable MV. In addition, with regard to the controlled variable PV output from the controlled system as well, simple information acquisition which allows to check real control feature amounts such as an overshoot amount and a hunting period makes it possible to automatically generate a mathematical model of the controlled system without any profound expert knowledge. Executing the simple method disclosed in reference 1 by using this mathematical model makes it possible to adjust parameters for the controller.

The control object model generation device described in this embodiment can be implemented by a computer comprising a CPU, a storage device, and an interface and programs for controlling the hardware resources. The CPU executes processing like that described in this embodiment in accordance with the programs stored in the storage device. Note that the programs are provided through a data communication network such as the Internet or by being stored in a recording medium such as an optical disk or a magnetic disk.

INDUSTRIAL APPLICABILITY

The present invention can be applied to the automatic generation of a controlled system model in process control.

The invention claimed is:

1. A control object model generation device comprising:
a model storage unit which stores a mathematical model of a controlled system in advance;
a controller storage unit which stores in advance a controller algorithm for virtually generating a controller;
a simulation computing unit which executes simulation for simulating a control response with respect to a control system including the controlled system represented by the mathematical model stored in said model storage unit and the controller represented by the controller algorithm stored in said controller storage unit;
a control feature amount evaluation item storage unit which stores, as a control feature amount evaluation item in advance, type of control feature amount which is used to evaluate a simulation result obtained by said simulation computing unit;
a real control feature amount storage unit which stores in advance the real control feature amounts of two or more types each corresponding to each of two or more types of the control feature amount evaluation items which are obtained from a control result on an actual controlled system;
a model control feature amount computing unit which calculates the model control feature amounts of the two or more types each corresponding to each of two or more types of the control feature amount evaluation items on the basis of a simulation result obtained by said simulation computing unit;
an evaluation function computing unit which computes an evaluation function value simultaneously indicating a similarity between the real control feature amounts of the two or more types stored in said real control feature amount storage unit and the model control feature amounts of the two or more types calculated by said model control feature amount computing unit; and
a controlled system model parameter search computing unit which causes said simulation computing unit to execute simulation while sequentially changing a value of a controlled system model parameter set in the mathematical model stored in said model storage unit, and determines, as a model parameter search result, a value of the controlled system model parameter which optimizes the evaluation function value obtained by said evaluation function computing unit.

2. A control object model generation device according to claim 1, characterized in that said controller storage unit stores in advance a controller algorithm for virtually generating a PID controller.

3. A control object model generation device according to claim 1, wherein said control feature amount evaluation item storage unit stores at least two of a set point arrival time, an overshoot amount, and a hunting period as a control feature amount in advance.

* * * * *